Aug. 29, 1967
I. K. MILLER
3,338,884
PROCESS FOR PRODUCING ABSORBENT CELLULOSE
PARTICLES BY SHEAR PRECIPITATION
Filed Jan. 25, 1966
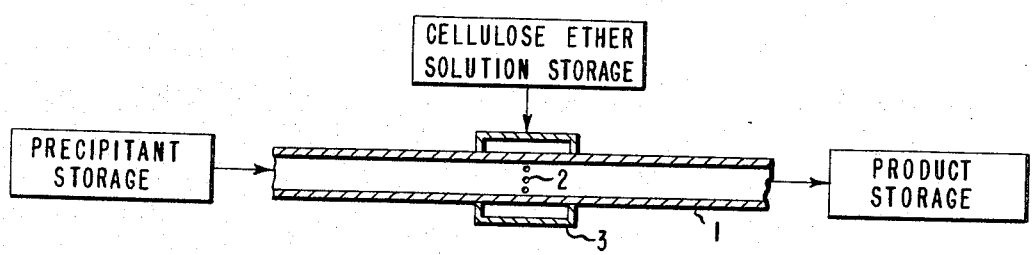
INVENTOR
I. KEITH MILLER
BY *Carl A. Hechman*
ATTORNEY

3,338,884
PROCESS FOR PRODUCING ABSORBENT CELLULOSE PARTICLES BY SHEAR PRECIPITATION
Ivan Keith Miller, Wilmington, Del., assignor to E. I. du Pont de Nemours and Company, Wilmington, Del., a corporation of Delaware
Filed Jan. 25, 1966, Ser. No. 522,949
4 Claims. (Cl. 260—232)

This application is a continuation-in-part of U.S. Ser. No. 148,066, filed Oct. 27, 1961, which in turn is a continuation-in-part of U.S. Ser. No. 738,846 and now abandoned, filed May 29, 1958.

This invention relates to a process. More specifically, it relates to a process for producing paper-forming absorbent fibrous cellulose ether particles obtained by shear precipitation, i.e., by precipitating the cellulose ethers from solution under conditions defined hereinafter.

In accordance with the present invention a process is provided for producing a paper-forming particle of a cellulose ether having a degree of substitution no greater than about 0.7 and a water absorbency between about 7 and 25 grams per gram when measured under a load of about 39 grams per square centimeter which comprises shear precipitating a cellulose ether having the desired degree of substitution from solution under conditions of shear and coagulation such that the component of the shear normal to the direction of initial travel of the cellulose ether solution as it enters the precipitant provides a total shear value between about 3 and about 10,000, the dimension "total shear value," $R'_s$, defined by the formula:

$$R'_s = \frac{V_p}{V_s} R_{pt}$$

wherein $V_p$ and $V_s$ are the viscosities of the precipitant and the cellulose ether solution respectively, in poises measured at their respective temperatures just prior to combining to form the precipitant, $t$ is the time in microseconds during which the precipitate is deformable with the proviso that when precipitation is performed in the presence of a stirring device such as the Waring Blendor, $R_p$ is defined in Formula (a) when the Reynolds number, $R_e$, of the system is no greater than 3350, i.e., laminar flow, and (b) when the Reynolds number exceeds 3350, i.e., turbulent flow, (a) $R_p = 0.005(a)^{3/2}(b)^{-1/2}(Q)^{3/2}(V_p)^{-1/2}(d_p)^{1/2}$
(b) $R_p = 0.137(a)^{6/5}(b)^{-4/5}(Q)^{6/5}(V_p)^{-1/5}(d_p)^{1/5}$ in which
$a$ = the distance in centimeters from the axis to the tip of the stirrer blade
$b$ = average width of stirrer blade in centimeters
$Q$ = stirring speed in r.p.m.
$V_p$ = viscosity of the precipitant in poises
$d_p$ = density of the precipitant in gm./cc.

$$R_e = \frac{\pi}{60} ab \frac{d_p}{V_p} Q$$

and with the proviso that when precipitation is performed in a tube precipitator, $R'_s$ is defined in equations (c) and (d) for laminar and turbulent flows respectively:

(c) $$R'_s = 1.27 \frac{V_p F}{V_s r_0} t$$

(d) $$R'_s = 0.0527 \frac{V_p^{5/8} F^{11/8} d^{3/8}}{V_s r_0^{27/8}} t$$

wherein F is the rate of flow of precipitating bath in cubic centimeters per second, $r_0$ is the radius of the tube in centimeters and the Reynolds number, $R_e$, is defined by the expression:

$$R_e = \frac{F d_p}{\pi r_0 V_p}$$

the remaining values being as defined above.

In calculating $t$ for these systems, it is assumed that the solution droplet in the shear zone coagulates or precipitates because coagulant, or precipitant diffuses from the bath into the drop until a certain critical concentration is obtained at a distance of 0.1 micron from the droplet surface. This critical concentration is the "Molarity Needed for Coagulation." It will be designated C and expressed in mols per liter.

The diffusion equation which is appropriate for these calculations is (e) $$C = C_0[1 - \chi(x/2\sqrt{Dt})]$$

where
$C$ = Molarity Needed for Coagulation
$C_0$ = bath concentration (molar)
$x$ = distance diffused (0.1 micron)
$D$ = diffusion constant ($10^{-5}$ cm.$^2$/sec.)

(f) $$\chi = \frac{2}{\sqrt{\pi}} \int_0^{x/2\sqrt{Dt}} e^{-y^2} dy$$

There is good theoretical justification for selecting values close to 0.1 micron for $x$ and close to $10^{-5}$ cm.$^2$/sec. for D, although the selection of these exact values is somewhat arbitrary. For convenience, it is assumed that D is the same for all ions, since this assumption introduces little error in the final calculations.

The value of C will depend on such variable as cellulose concentration, caustic content, DP, additives, etc. However, all of these variables are taken into account by the salt index S, which is commonly used in the viscose industry, and this measurement can be used equally as readily for the cellulose ether solutions or the cellulose etherester solutions of this invention. by the use of one cellulose ether solution as a standard, a Table of Molarities (C values) can be developed for the various salt solutions which are commonly used for precipitating cellulose ether or cellulose etherester solutions. C should, therefore, be multiplied by $S/S_{std}$ before applying equation (e) to a solution which has an index other than the standard chosen. S is the index of the solution being used and $S_{std}$ is the index used for developing the Table of Molarities. The proper equation is then, (g) $$Y = \frac{SC}{S_{std} C_0} = 1 - \chi\left(\frac{x}{2\sqrt{Dt}}\right)$$

Values of $t$ are calculated by substituting selected values for $$\frac{SC}{S_{std} C_0}$$

in equation (g). When these calculated values of $t$ are plotted against $$\frac{SC}{S_{std} C_0}$$

it is found that $t$ becomes infinite when $$\frac{SC}{S_{std} C_0}$$

becomes 1. Physically, this means that the fibrous precipitates of this invention cannot be formed when Y (i.e..

$$\frac{SC}{S_{std} C_0}$$

is greater than 1.

Accordingly, a graph is constructed showing the relationship between $t$ and $Y$ by selecting values of $Y$ between 0 and 1. If C is not known it may be determined by the salt index method, and calculating corresponding values of $t$ or determining $t$ from a suitable Table of Integrals. Thus, $Y$ can be calculated from the available experimental data on the coagulation bath and $t$ determined from the graph.

If the salt index is determined directly for the bath which is being used, the method described above will apply equally well to single component and multi-component baths. The Table of Molarities Needed for Coagulation can, of course, be used directly for a single component bath. If no values are available for the multi-component bath used, an excellent approximation of the correct value for $Y$ can be obtained by calculating with the aid of the following equation, using the values for each individual component taken from the Table of Molarities.

(h)
$$Y = \frac{S}{S_{std}} \frac{1}{\frac{C_{0,1}}{C_{1crit}} + \frac{C_{0,2}}{C_{2crit}} + \frac{C_{0,3}}{C_{3crit}}}$$

in which $C_{0,1}$ = molar concentration of component 1
$C_{0,2}$ = molar concentration of component 2
$C_{0,3}$ = molar concentration of component 3 and $C_{1crit}$ = molarity of component 1 needed for coagulation in a 1-component bath
$C_{2crit}$ = molarity of component 2 needed for coagulation in a 1-component bath
$C_{3crit}$ = molarity of component 3 needed for coagulation in a 1-component bath This type of calculation can be extended to a bath containing more than three components, but such baths are generally not used. Obviously, the equation can be used for a two-component bath system.

The invention will be more readily understood by reference to the illustration wherein:

FIGURE 1 is a diagrammatic representation of the apparatus used in Example III. In the figure, precipitant is fed through one end of tube 1, is mixed with cellulose ether solution at holes 2 which are fed by manifold 3. The product is recovered at the end of tube 1 opposite to that to which precipitant is fed.

The following examples are cited to illustrate the invention. They are not intended to limit it in any manner.

Water absorption is measured by distributing evenly, without compression, a 2 gram sample of the material in a Büchner funnel (2½' diameter by 1 3/16" deep). Water (100 ml.) containing 0.1 gram of sodium lauryl sulfate is poured over the sample and allowed to drain by gravity for about 1 minute. The funnel is then connected to an overflowing reservoir so as to produce a ⅜" head of water in the funnel at equilibrium. When water begins to flow into the funnel, a No. 11 rubber stopper weighing 67.4 grams is placed on the sample with the large face down. A 2 lb. weight is placed on the stopper. After 10 minutes, the petcock is turned to permit the sample to drain. After an additional 10 minutes, the sample is removed and weighed. The increase in weight is the amount of water absorbed.

The salt index used to determine the effectiveness of coagulating baths is based upon the fact that the cellulose derivative solution is partially precipitated when a drop of the solution is dispersed in an aqueous sodium chloride solution. When a definite and reproducible degree of coagulation is adopted as the end point and the manner of dispersing the solution is standardized, the concentration of sodium chloride required to reach the end point is a direct and reproducible measure of the coagulability of the solution. The concentration (expressed percent of salt solution) which produce this end point is reported as the index. The technique employed in its determination is exactly the same as that employed in the viscose rayon industry for regenerated cellulose.

*Example I*

Six pounds of cotton linters are steeped in 18% caustic at 27.5° C. for 45 minutes. After the caustic has been drained, the alkali cellulose is shredded for 80 minutes at 27.5° C., aged for 9½ hours at 27.5° C. and thereafter placed in a baratte with 31.4% by weight (based on the weight of cellulose) of carbon disulfide and 0.12 gram of acrylonitrile for each gram of alkali cellulose. These reactants are mixed for 2½ hours at 5° C. Sufficient caustic is then added to produce a solution containing 5.0% cellulose and 5.5% caustic (calculated as sodium hydroxide). The cellulose etherester has 16.5% of the available hydroxyl groups substituted with cyanoethyl groups (i.e., has a degree of substitution of 0.5 with respect to cyanoethyl ether groups). The cellulose etherester has an index 20 and a viscosity of 32 Du Pont seconds (9.9 poises).

100 grams of this solution is added at room temperature to 400 ml. of a coagulating bath in a 1-qt. Waring Blendor operating at approximately 9,200 r.p.m. The aqueous coagulating bath (C value of 1.11) contains 18.5% by weight of sodium sulfate (Co of 1.77), 9.5% by weigth of zinc sulfate (Co of 0.80), and 10% by weight weight of zinc sulfate (Co of 1.39). The system has a "Y" value of 0.0066, a "$t$" of 0.67 microseconds and an $R'_s$ of 71. The fibrous regenerated cellulose ether formed is washed thoroughly with water, rinsed with acetone and air-dried. The dried product has a water absorbency under the load of about 39 grams per square centimeter of 11.3 grams per gram.

Upon repetition of the experiment with the Waring Blendor operating at approximately 13,800 r.p.m., the cellulose ether obtained has a water absorbency under a load of 39 grams per square centimeter of 14.5 grams per gram. In this system $R'_s$ is 114.

A product with a water absorbency of 22.3 grams per gram under a 39 gram per square centimeter load is formed when the above technique is modified by use of an aqueous coagulating bath containing 20% by weight of sodium sulfate and 0.5% by weight of lauryl pyridinium chloride. After precipitation is complete, 300 ml. of 5% sulfuric acid solution are added to the blendor and the mixture is allowed to stand without stirring for 5 minutes. The fibrous regenerated cellulose ether precipitate is washed with 10 liters of water, rinsed with acetone, and air-dried.

A regenerated cellulose ether with an absorbency of 11.4 under the 39 gram per square centimeter load is obtained when the cellulose etherester is coagulated in a 15% ammonium sulfate solution and the coagulum soaked in a 5% sulfuric acid solution at room temperature for 5 minutes. When these baths are replaced with a 17% solution of sodium sulfate buffered to pH 3 with a phosphate buffer, a fibrous regenerated cellulose ether with a water absorbency of 13.9 grams per gram under the load of 39 grams per square centimeter is obtained.

*Example II*

A cellulose etherester is prepared as described in Example I. The theoretical degree of substitution, based on the compositions charged to the baratte, is 0.5 with respect to cyanoethyl groups, although subsequent infrared analysis indicated that a substantial percentage of these cyanoethyl groups have hydrolyzed to carboxyethyl groups on standing. The solution, which contains 5% by weight of cellulose, is ripened until is has a viscosity of 32 Du Pont seconds (9.9 poises) and a salt index of 20.5.

Absorbent fibrous precipitates are formed by injecting this solution into a precipitant flowing through a tube 100 cms. long with an inside diameter of 2 mm. Equidistant from the two ends of the tube are six 20 mil diameter holes spaced an equal distance from each other. An aqueous precipitating bath having a density of 1.36 grams/cc. and a viscosity of 0.01 poises and containing 9.7% by weight of sulfuric acid, 5.5% by weight of zinc sulfate, and 17.4% by weight of sodium sulfate is introduced at the inlet at a rate of 45 ml. per second under a pressure of 46 p.s.i. The cellulose etherester solution is introduced through the holes at a center of the tube at a rate of 22 ml. per second under a pressure of 60 p.s.i. The system has a "Y" value of 0.0102, a "t" of 0.75 microseconds and an $R'_s$ of 111. The effluent mixture of solution and precipitant contains about 1.6% by weight of the fibrous precipitate formed. This is separated by filtration and washed thoroughly with water. The filter cake is then rinsed with acetone, dried in air for about 15 hours, and then in an oven at 80° C. for approximately ½ hour. The dried product has a water absorbency of 17.4 grams per gram.

*Example III*

A cellulose etherester with a degree of substitution of ether groups of 0.5 is prepared as described in Example I. The viscous solution, which contains 5% by weight of cellulose, is ripened until it has a viscosity of 26 Du Pont seconds (8.1 poises) and a salt index of 21.5. Absorbent fibrous precipitate are prepared from this solution by the use of another tube 10 cms. long with a 2 mm. inside diameter. However, in place of the single row of holes, there are 3 rows of twelve 10 mil diameter holes. The first row of holes is 4.2 cms. from the entrance of the tube and the rows are 2 mm. apart. An aqueous precipitant having a density of 1.36 grams per cc. and a viscosity of 0.01 poises containing 8.0% by weight of sulfuric acid, 1.5% by weight of zinc sulfate, and 17.0% by weight of sodium sulfate, is introduced at the entrance of the tube at a rate of 37 cc. per second. The cellulose etherester solution is introduced in through the three rows of holes at a rate of 290 ml./min. The system has a "Y" value of 0.024, a "t" of 0.98 microseconds and an $R'_s$ of 134. The absorbent cellulose ether fibrous precipitate is separated from the effluent by filtration, washed thoroughly with water and acetone, and dried at room temperature in a stream of air. The fibrous precipitate has a water absorbency of 18.4 grams per gram.

*Example IV*

A cellulose etherester with a degree of substitution of ether groups of 0.3 is prepared as described in the first example. The solution, which contains 5% by weight of cellulose, is ripened until it has a salt index of 21.6 and a viscosity of 19 Du Pont seconds (5.9 poises). Absorbent fibrous precipitates are prepared using the apparatus of Example III. The aqueous precipitant, which contains 9.5% by weight of sulfuric acid, 9.5% by weight of zinc sulfate, and 17.5% by weight of sodium sulfate, has a density of 1.36 grams per cc. and a viscosity of 0.01 poises. It is introduced at a rate of 36 cc. per second under a pressure of 46 p.s.i. The cellulose etherester solution is introduced under a pressure of 60 p.s.i. The system has a "Y" value of 0.0072, a "t" of 0.68 microseconds and an $R'_s$ of 131. A 0.9% consistency slurry is obtained at a rate of 43 ml. per second. The fibrous precipitate is washed thoroughly with water and dried for 20 minutes in a column of air heated to 88° C. The dried product has a water absorbency of 17.0 grams per gram.

The cellulose ethers which can be used in this invention have degrees of substitution between 0.02 and 0.7 preferably between 0.1 and 0.6. These cellulose ethers may contain more than one type of ether group. Regenerated cellulose ethers with the desired absorbency can be prepared successfully from solutions having viscosities in the range of 2.5 to 150 poises. The most useful products are substantially insoluble in up to 30 times their own weight of water. Suitable derivatives include the alkyl ethers, such as ethylcellulose; the carboxyalkyl ethers, as carboxymethylcellulose and carboxyethylcellulose; the hydroxyakyl ethers, such as hydroxyethylcellulose; the arylalkyl ethers, such as benzylcellulose; and the beta-substituted alkyl ethers, such as cyanoethylcellulose. The preferred member of this class is cyanoethylcellulose.

Mixed ethers may also be used. For example, some of the nitrile groups in cyanoethylcellulose may be hydrolyzed; part of these may stop at the amide stage and the remainder be converted to carboxyl groups. Thus, there would be three types of ether groups present. Mixed etheresters may also be used, e.g., one containing a mixture of acetate and ether groups.

Several methods are available for preparing cellulose ethers, but the one of primary importance is the reaction of alkali cellulose with a suitable reagent. More details about cellulose ethers can be found on pages 882–958 in part 2 of vol. V of the High Polymers Series entitled "Cellulose," edited by Ott and Spurlin, Interscience Publishers, 2nd edition, 1954. The examples of the present disclosure illustrate another route to cellulose ethers, in which a mixture of carbon disulfide and the ether forming reagent are added to alkali cellulose. This aids in the formation of a soluble material, even though the ester groups do not appear in the final product.

A variety of fibrous regenerated products all within the scope of the present invention can be obtained by precipitating the cellulose ethers from solution within the range of total shear values defined herein. The principal factors affecting the nature of the product obtained are the solution viscosity, the extent of shear applied during coagulation, and the nature of the precipitating bath. Of these, the latter is the most important.

The over-all effectiveness of the coagulating system, i.e., rate of coagulation, shear applied, etc., is the primary factor regulating the process and the nature of the products claimed herein. The rate of coagulation has the greatest effect on the nature of the product obtained. Another very important variable is the extent of shear applied to the precipitate while it is deformable. Accordingly, the shearing is varied in conjunction with the coagulation rate to produce a fibrous product with the desired properties. If a more rapid coagulant is used, and it is desired to produce a similar product, it will be necessary to increase the rate of shear correspondingly. Bath variables, such as viscosity and temperature, have less effect on the properties of the product than the nature of the coagulant.

The over-all effectiveness of the bath as a coagulating agent can be determined by the salt index method familiar to the rayon industry. Although this method has been limited to viscose solutions, it can be extended quite readily to alkaline solutions of cellulose ethers which are relatively insoluble in water. For convenience, a description is given of this method, as adapted to cellulose ethers.

The major requirement on the shearing conditions during coagulation is that the shear be adequate to extend the precipitate into the form of a fibrous or ribbon-like structure. Within the operable range, the shear may be varied appreciably while still producing products of rather comparable properties. Shearing action during coagulation is dependent to some extent upon the design of the stirrer and the vessel in which precipitation occurs. Suitable shearing action for preparing the products of this invention may be obtained by the use of a stirrer having the paddle or blade at an angle to the plane of rotation of the paddle or blade. The design of the stirrer blade used in a Waring Blendor has been found to be particularly satisfactory. Turbulence can be increased by introducing suitable baffles in the mixing vessel. The results indicated that fibrous precipitates with a particularly desirable morphology are obtained when precipitation occurs in a shear zone which is also turbulent. The combination of stirrer action and container design generally used in the practice of this invention produces precipitating conditions which combine turbulence with adequate shear.

Other types of apparatus may also be used if they provide sufficient shear and turbulence. For example, some cellulose ether solutions may be jetted into suitable coagulants to produce satisfactory absorbent products. Some of the examples illustrate the preparation of these products by injecting the cellulose derivative solution into a flowing stream of precipitant. Other modifications may be devised by those skilled in the mixing art.

The formula for $R'_s$ presented earlier is derived from the rate of shear, R, which is proportional to the shearing stress, S. Introducing the viscosity, V, as a proportionality constant, the equation becomes $$S = VR$$

Using the subscript $s$, for the solution and the subscript $p$, for the precipitant or coagulant, the shearing stress in the precipitant and in the solution is given by the equations $$S_p = V_p R_p \qquad (1)$$

$$S_s = V_s R_s \qquad (2)$$

It is reasonable to assume that the shearing stress is transmitted undiminished from the precipitant to the solution, so that $$S_p = S_s \qquad (3)$$

and Equations 1 and 2 may be equated to give $$R_s = \frac{V_p}{V_s} R_p \qquad (4)$$

The type of fiber products formed will depend on $t$, the time interval during which the precipitate is deformable. The product $R_s t$ will be designated $R'_s$ (the total shear), which is determined from the relationship $$R'_s = \frac{V_p}{V_s} R_p t \qquad (5)$$

Some generalizations can be drawn about the process conditions without reference to any specific experimental results. For example, if the particles obtained upon precipitating the cellulose ether under a certain set of conditions are too fine, it will be necessary to decrease the shearing forces (by decreasing the stirring speed or by increasing the viscosity) and/or to increase the rate of coagulation. This latter effect can be accomplished by increasing the cellulose DP, the cellulose concentration, etc., or by increasing the salt concentration in the bath, or by heating the bath, or by selecting a stronger coagulant. Conversely, if the particles are too coarse, the reverse changes can be made.

The cellulose ether solution or the precipitant, or both, may contain additives for modifying the nature of the products obtained. Either the solution or the precipitant may contain synthetic and/or natural staple fibers, such as those from nylon, poly(ethylene terephthalate), or polyacrylonitrile, staple fibers from cellulose, glass fiber, asbestos, cellulosic pulps, etc. In addition, either may contain the fibrids described in United States Patent No. 2,999,788, dated Sept. 12, 1961. They may also contain dyes, antistatic agents, surfactants, fillers, such as silica or titanium dioxide, pigments, antioxidants, etc. In general, it is more desirable to add fibrous materials to the precipitating or coagulating bath, because of the greater difficulty associated with dispersing them in the viscous cellulose ether solutions.

The cellulose ether solution may also contain dispersed polymer particles, such as polytetrafluoroethylene or polyacrylonitrile.

After these modified solutions have been converted to fibrous precipitates, the cellulose ether may be removed by heating or by chemical action to form fine fibrils of the synthetic polymer which had been added.

Many of the absorbent products formed by the process of this invention may be formed into coherent products by conventional paper-making or slush molding techniques. These products have the strong self-bonding or inter-locking properties associated with conventional cellulosic pulps. Strong paper-like sheets can frequently be prepared by beating the fibrous precipitates in conventional pulp beating equipment prior to formation of the sheet. These products, whether beaten or not, may be blended with cellulosic pulps or man-made fiber staple, or with fibrids, before preparation of sheet products. Thus, the products of this invention have the additional advantage that shaped articles may be prepared directly from the aqueous slurries in which they are formed.

The absorbent products formed by the process of this invention have a number of important applications where their unusually high absorbency has been utilized, such as in sponges and in sanitary napkins. Additional uses are in surgical dressings, bandages, disposable diapers, paper towels, toilet paper, cosmetic pads, anti-perspirant pads, air filters, cigarette filters, etc. Surgical dressings and bandages prepared from these products may be impregnated with antiseptics, antibiotics, or other appropriate medicinal agents.

Many equivalent modifications of the above will be apparent to those skilled in the art from a reading of the above without a departure from the inventive concept.

What is claimed is:

1. A process for producing a paper-forming particle of a cellulose ether having a degree of substitution no greater than about 0.7 and a water absorbency between about 7 and 25 grams per gram when measured under a load of about 39 grams per square centimeter which comprises shear precipitating a cellulose ether having the desired degree of substitution from solution under conditions of shear and coagulation such that the component of the shear normal to the direction of initial travel of the cellulose ether solution as it enters the precipitant provides a total shear value between about 3 and about 10,000, the dimension "total shear value," $R'_s$, defined by the formula:

$$R'_s = \frac{V_p}{V_s} R_p t$$

wherein $V_p$ and $V_s$ are the viscosities of the precipitant and the cellulose ether solution respectively, in poises measured at their respective temperatures just prior to combining to form the precipitant, $t$ is the time in microseconds during which the precipitates is deformable with the proviso that when precipitation is performed in the presence of a stirring device $R_p$ is defined in formula (a) when the Reynolds number, $R_e$, of the system is no greater than 3350, i.e., laminar flow, and (b) when the Reynolds number exceeds 3350, i.e., turbulent flow.

(a) $R_p = 0.005(a)^{3/2}(b)^{-1/2}(Q)^{3/2}(V_p)^{-1/2}(d)_p^{1/2}$
(b) $R_p = 0.137(a)^{6/5}(b)^{-4/5}(Q)^{6/5}(V_p)^{-1/5}(d_p)^{1/5}$ in which $a$ = the distance in centimeters from the axis to the tip of the stirrer blade
$b$ = average width of stirrer blade in centimeters
$Q$ = stirring speed in r.p.m.
$V_p$ = viscosity of the precipitant in poises
$d_p$ = density of the precipitant in gm./cc.

$$R_e = \frac{\pi}{60} a b \frac{d_p}{V_p} Q$$

and with the proviso that when precipitation is performed in a tube precipitator, $R'_s$ is defined in equations (c) and (d) for laminar and turbulent flows respectively:

(c) $$R'_s = 1.27 \frac{V_p F}{V_s r_0} t$$

(d) $$R'_s = 0.0527 \frac{V_p^{5/8} F^{11/8} d_p^{3/8}}{V_s r_0^{27/8}} t$$

wherein F is the rate of flow of precipitating bath in cubic centimeters per second, $r_0$ is the radius of the tube in centimeters and the Reynolds number, $R_e$, is defined by the expression:

$$R_e = \frac{F d_p}{\pi r_0 V_p}$$

the remaining values being as defined above.

2. The process of claim 1 wherein the shear value provided is between about 100 and about 1600.

3. The process of claim 1 wherein the said ether is a beta-substituted alkyl ether.

4. The process of claim 3 wherein the said ether is cyanoethylcellulose.

References Cited

UNITED STATES PATENTS 2,332,049 10/1943 Bock _____ 260—231
2,375,847 5/1945 Houtz _____ 260—231

OTHER REFERENCES

Somers: "New Family of Rayons," British Rayon and Silk Journal for May 1950, pp. 62, 63 and 88.

DONALD E. CZAJA, *Primary Examiner.*

LEON J. BERCOVITZ, *Examiner.*

R. W. MULCAHY, *Assistant Examiner.*